United States Patent Office 3,790,527
Patented Feb. 5, 1974

3,790,527
FLEXIBLE TACK FREE SILICONE RESINS
Duane F. Merrill, Ballston Spa, N.Y., assignor to
General Electric Company
No Drawing. Filed July 21, 1972, Ser. No. 274,111
Int. Cl. C08f 11/04
U.S. Cl. 260—46.5 R      8 Claims

ABSTRACT OF THE DISCLOSURE

There is provided a flexible, tack-free silicone resin by hydrolyzing first a diorganodihalosilane in a hydrolysis mixture comprising water, acetone and a water-immiscible solvent and then in a second and independent step hydrolyzing and adding to the same mixture an organotrihalosilane. The silicone resin obtained by this hydrolysis procedure is the desired resin of the present case which is not brittle and dries to a non-tacky state irrespective of whether it is dried at room temperature or dried at elevated temperatures.

BACKGROUND OF THE INVENTION

The present invention relates to silicone resins and more particularly the present invention relates to silicone resins which are flexible and can dry prior to cure to a non-tacky and non-flowable state.

As is well known, silicone resins are used to produce laminates, coatings on glass tapes and also as basic ingredients in the formulation of high temperature paints. The advantages of such silicone laminates, coatings or paints is that the silicone ingredients impart to the resulting material high temperature stability as well as weatherability. In the preparation of such coatings, laminates or paints and particularly coatings for glass tapes which coated glass tapes are used to insulate electrical components, it is desired to coat the glass tape with a silicone material and then have the silicone material remain on the glass tape in an uncured state. Then the glass tape is handled in various ways, for instance, the glass tape may be wound around a particular component so as to properly cover and insulate the electrical component. It was found for this reason that the silicone resin prior to cure could not be too brittle because if it was used to coat a glass tape and then the glass tape was wound around an object, then if the uncured silicone resin was too brittle it would break and fall off the glass tape. Thus, it was desired to have a flexible resin which could be used to form laminates or coat glass tapes.

To produce such flexible silicone resin it is well known in silicone resin chemistry to include a large amount of difunctional silanes in the hydrolysis procedure. Unfortunately, the additional or large amounts of difunctional silanes that were added to the hydrolysis mixture made the resulting resin very tacky prior to its final cure. Thus, even with a bodying step being utilized after the silicone resin had been applied to a glass tape, such a bodying step merely being to heat the coated glass at elevated temperatures so as to condense some of the silanol groups in the silicone resin, nevertheless, even such a bodied silicone resin was still found to be quite tacky. The difficulty was that when the manufacturer of the glass tape which was coated with silicone resin produced such a coated glass tape then the sticky silicone resin or the tacky silicone resin which was coated on the surface of the glass tape would mass in contact with each other so it was very difficult to unrole the glass tape. In addition, with such a tacky silicone resin as that of the prior art, it was very difficult to produce proper laminates which could be handled properly. In addition, if such a silicone resin of the prior art was utilized as a basic ingredient in paints, then the paint would be sticky prior to final cure and would pick up dirt very easily.

The alternative to the sticky, flexible tape in accordance with the teachings of the prior art was to, of course, add a large amount of trifunctional silanes in the hydrolysis mixture which would result in a silicone resin which was non-tacky prior to cure. However, as stated previously, such silicone resins were very brittle and thus were undesirable for the coating of insulating materials. Accordingly, heretofore, no one had arrived at a solution for making a silicone resin which prior to cure is both flexible, that is, non-brittle and also non-tacky.

Thus, it is one object of the present invention to provide a process for producing a flexible silicone resin.

It is another object of the present invention to provide a process for producing air drying or non-tacky silicone resins.

It is an additional object of the present invention to provide an efficient process for producing a silicone resin which is both non-tacky and also flexible.

These and other objects of the present invention are accomplished by means of the process set forth below.

SUMMARY OF THE INVENTION

In accordance with the above objects, there is provided in the present case a process for the preparation of a non-tacky, flexible silicone resin prior to the cure of said resin, comprising hydrolyzing organohalosilanes consisting essentially of organotrihalosilanes and diorganodihalosilanes by first (A) agitating said diorganodihalosilanes in a heterogenous hydrolysis mixture comprising (1) from about 1.7 parts to about 10 parts by weight of water per part of said organohalosilanes, (2) from about 0.2 to about 5 parts by weight of acetone, per part of said organohalosilanes, and (3) from about 0.3 part to about 5 parts by weight of a water-immiscible organic solvent, (B) adding with agitation in a separate and independent step from (A) said organotrihalosilanes to said hydrolysis mixture, and (C) separating an organic solvent solution from the hydrolysis mixture which solution contains a silicone resin having an average ratio from about 1.1 to about 1.9 organic radicals per silicone atom and having a silanol content of 0.5 to 12% by weight, wherein the organo radicals of said organohalosilanes and of the silanol-containing silicone resin are attached to silicon by carbon silicon linkages and are selected from the group consisting of monovalent hydrocarbon radicals, halogenated monovalent hydrocarbon radicals and cyanoalkyl radicals.

The important aspect of the present invention is that the diorgano and trihalosilanes are hydrolyzed separately. Thus, there is formed a kind of block polymeric silicone resin in accordance with the process of the present invention. Preferably, the diorganodihalosilanes are first hydrolyzed in the hydrolysis mixture and then the organotrihalosilanes are added to the hydrolysis mixture and hydrolyzed therein to form the final block copolymer silicone resin.

In the alternative, the organotrihalosilane can be added first and hydrolyzed in the hydrolysis mixture and then in an independent and separate step there may be added the diorganodihalosilane into the hydrolysis mixture. However, this alternative procedure in which the organotrihalosilanes are hydrolyzed first is not preferred since the final silicone resin product tends to be somewhat tacky. Accordingly, the most unique process of the present invention comprises adding the diorganodihalosilanes to the hydrolysis mixture first and hydrolyzing them. Then in a second and separate step adding the organotrihalosilanes to the hydrolysis mixture. Utilizing the foregoing sequence of steps there is obtained the preferred silicone resin of the present case.

It should also be mentioned that such a silicone resin is not capable of being defined in terms of a chemical structure even though the organic group to silicon atom ratio is known and even though its hydroxyl content and hydroxyl content range is known. The reason is that the physical/chemical structure of the silicone resin is not known, that is, the type of block copolymer structure and the manner and way in which the hydroxyl groups are attached to the silicon atoms is not known so it is not possible to set forth a particular chemical structure in this case to identify the preferred silicone resin of the present case. Rather, the only way that the flexible and non-tacky silicone resin of the present case can be identified is in terms of the process by which it is produced.

The silicone resin produced in accordance with the above process has an organo group to silicon ratio that varies from generally about 1.1 to 1.9 and preferably from about 1.4 to 1.7 and has a silanol content of 0.5 to 12% by weight.

DESCRIPTION OF THE PREFERRED EMBODIMENT

It is important to note that in the present case preferably there should not be any alcohol present either in the reactants or in the hydrolysis mixture of water, the water-immiscible solvent and the acetone. The only organohalosilanes that can be utilized in the process of the present invention is diorganodihalosilane or a triorganohalosilane and these two halosilane reactants must be utilized or added to the hydrolysis mixture such that the final organo to silicon ratio is preferably between the range of 1.4 to 1.7. In addition, preferably hydrocarbonoxy containing halosilanes should not be used as reactants in the process of the present invention. The reason for desirably not having present hydrocarbonoxy containing halosilanes or alcohol which may be added along with the halosilanes or alcohol which may be present in the hydrolysis mixture is to prevent the presence of alkoxy or hydrocarbonoxy groups attached to the silanes in the silicone resin product of the present invention. The presence of such hydrocarbonoxy or alkoxy groups in the silanes which may be either in the silane reactants or which hydrocarbonoxy groups may be formed in situ in the hydrolysis mixture prevents the formation of the type of block copolymer silicone resins of the present invention that are desired. In the less preferred embodiment of the present case, there may be some hydrocarbonoxy groups in the total silicone resin product of the present invention that is produced by the process of the present case. Thus, there may be present up to 10 mole percent of hydrocarbonoxy or alkoxy groups attached to the silicon atoms in the silicone resin product. Thus, in the organohalosilane that is hydrolyzed in accordance with the process of the present invention, there may be present as much as 10 mole percent of hydrocarbonoxy groups or alkoxy groups attached to the silicon atoms or in the alternative there may be added sufficient alcohol to the hydrolysis mixture so that up to 10 mole percent of the organohalosilanes is alkoxylated such that there will be present up to 10 mole percent of hydrocarbonoxy groups in the final silicone resin product. However, as mentioned previously, preferably there is not added any alcohol to the hydrolysis mixture and most preferably the organohalosilane reactants that are added to the hydrolysis mixture do not contain any hydrocarbonoxy groups thereon. Thus, in the most preferred case there is present in the process of the present invention as reactants sufficient diorganodihalosilane and sufficient monoorganotrihalosilane so that the final resin product has an organo to silicon ratio of 1.4 to 1.7.

The limits for this ratio is due to the fact that when the organo to silicon ratio is below 1.4, then the resin becomes considerably brittle. On the other hand, if the organo to silicon ratio is above 1.7, then the resin product may be too tacky. Accordingly, the most preferred organo group to silicon atom ratio in the silicone resin product of the present invention is a ratio that varies from 1.4 to 1.7. Generally, however, the organo to silicon atom ratio can vary anywhere from 1.1 to 1.9.

It should also be pointed out at this juncture that with the prior art process it was not possible to add either the organotrihalosilane first to the hydrolysis mixture and then add the diorganodihalosilane to the hydrolysis mixture and so obtain the block copolymer silicone resin of the present case. When this was done with the prior art processes, the resulting hydrolysis mixture gelled. In addition, as is also well known, It was not possible with the prior art hydrolysis process to add the diorganodihalosilane first to the hydrolysis mixture and then in a separate and independent step add the organotrihalosilane to the same hydrolysis mixture since the resulting hydrolysis mixture would also gel. Accordingly, the separate sequence of addition steps of adding the organotrihalosilane and the diorganodihalosilane as is taught by the present disclosure was not possible with the prior art processes.

It should be noted that the use of acetone in the hydrolysis mixture and particularly a heterogenous hydrolysis mixture is disclosed in the docket of Duane F. Merrill, entitled "Fast Curing Silanol Containing Organopolysiloxane Resins and a Method for Making Them," filed on Feb. 16, 1971, Ser. No. 115,715. However, it is not taught in that patent application the desirable and preferred sequence of addition steps set forth in the instant case. It must be noted that the sequence of addition steps set forth in the instant case is critical, that is, the organotrihalosilane and the diorganodihalosilane may not be added at the same time to the hydrolysis mixture composed of the water, acetone and water-immiscible organic solvent. In the less preferred method, the organotrihalosilane is first added to the hydrolysis mixture and after it has been hydrolyzed there is then added to it the diorganodihalosilane.

In the most preferred embodiment of the present invention, the diorganodihalosilanes are first added to the hydrolysis mixture and then in a separate and independent step after the hydrolysis of the diorganodihalosilane has been completed, there is added the organotrihalosilanes.

In the above description of the process of the present invention the amount of water, acetone and water-immiscible solvent that is present in the hydrolysis mixture is based on the total amount of organohalosilanes that is placed into the hydrolysis mixture, which total amount of organohalosilanes comprises the total amount of organotrihalosilanes and diorganodihalosilanes.

With the amount of reactants that are present in the hydrolysis mixture and as identified previously, the hydrolysis mixture is a heterogenous hydrolysis mixture, that is, there is a polar phase and a non-polar phase present in the hydrolysis mixture. With the amount of water that is disclosed in the description of the process of the present invention, when the water, acetone and water-immiscible solvent mixture is formed there is a heterogenous mixture, that is, there will be a polar phase and a non-polar phase in the hydrolysis mixture. The presence of a heterogenous hydrolysis mixture is also a critical part of the present invention. The acetone that is utilized in the hydrolysis mixture is partly dissolved in the water-immiscible phase and partly dissolved in the polar phase and as such acts as a stabilizing agent for the block copolymer silicone resins of the present invention that are formed in the hydrolysis mixture in accordance with the process of the present invention. It is not the purpose of acetone in the process of the present invention for the acetone to act as a cosolvent for the formation of a homogeneous phase. As was stated previously, the acetone is present solely for the purpose of stabilizing the block copolymer silicone resins that are formed in the polar phase and to stabilize the same copolymer silicone resins after they have migrated to the non-polar phase, that is, the water-immiscible organic solvent phase.

Such a heterogenous hydrolysis mixture with the utilization of acetone results in the formation of block copolymer silicone resins in accordance with the process of the present invention which may have a silanol content of as high as 12% by weight or more. However, the high silanol content of the block copolymer silicone resins of the present invention is not the only distinguishing factor of such resins.

As pointed out previously, such silicone resins produced in accordance with the process of the present invention also have outstanding physical properties in terms of a combination of non-tackiness as well as being flexible, which physical properties of the resins of the present invention result from the process by which they are produced.

It is not known what the chemical structure of the silicone resins of the present invention are which results in their having these outstanding physical properties except that by reason of the process by which they are produced these block copolymer silicone resins of the present invention have an outstanding combination of physical and chemical properties and in particular a combination of good flexibility with non-tackiness in the precured but dried state.

It should also be mentioned that the use of acetone is critical in the process of the present invention. It has been found by the applicant that no other polar solvent or non-polar solvent will function in the process of the present invention as a stabilizing agent other than acetone. With the limitations above, the process of the present invention may be carried out in any manner. Generally, the diorganodihalosilane is first added to the mixture of water, acetone and organic solvent and then after the hydrolysis is complete then the organotrihalosilane is added to the hydrolysis mixture. Preferably, when this mixture is used a proportion of from 2 to 6 parts of water, 0.3 to 2 parts of acetone and 0.6 to 2 parts of water-immiscible organic solvent is used per part of the total amounts of organotrihalosilane and diorganodihalosilane which are to be reacted. It is preferred that the organohalosilanes be added to the hydrolysis mixture rather than vice versa as this limits the concentration of hydrochloric acid which is formed during the hydrolysis reaction. A strong hydrochloric acid solution is undesirable in the hydrolysis mixture as the hydrochloric acid causes acid polymerization of the acetone forming polymerization products which add undesirable color to the product and have a deleterious effect on physical properties of the product.

In the preferred embodiment of the process of the present invention there is utilized a dual-feed process. The dual-feed process comprises feeding the diorganodihalosilane, from 0.45 to 2.5 parts preferably 0.45 to 0.6 part of the acetone from separate containers and through separate conduits, then premixing them immediately prior to hydrolysis. Then in the second and independent step, there is added the organotrihalosilane and from 0.45 to 2.5 parts and more preferably from 0.45 to 0.6 part of the acetone from separate containers and through separate conduits which ingredients are premixed immediately prior to hydrolysis or immediately prior to being directed into the container containing the rest of the hydrolysis mixture. It is necessary to limit the contact time of small amounts of water present in the acetone or in the atmospheric contact with the organohalosilanes as the water present causes hydrolysis of either the organotrihalosilane or the diorganodihalosilane generating the acid which causes the acetone to polymerize. The initial hydrolysis medium prior to the introduction of either of the silane acetone mixtures contains from 0 to 0.41 part of the acetone and preferably from 0.9 to 1.2 parts of the acetone and from 0.3 part to about 5 parts by weight of the water-immiscible organic solvent and from 1.7 parts to about 10 parts by weight of water, both ingredients being based per part of both the diorganodihalosilane and the organotrihalosilane. The products produced by this dual-feed method are among the more preferred products produced by the methods of the present invention since the silicone resin products have a combination of flexibility with non-tackiness which is superior to other methods of addition of the organohalosilane reactants into the hydrolysis mixture is accordance with the process of the present invention.

The preferred products can also be produced by a process in which the polymerization of acetone is prevented by the presence of carbon dioxide. This method comprises mixing carbon dioxide, 0.45 to 2.5 parts and preferably from 0.45 to 1.2 parts of the acetone and the diorganodihalosilane and adding this mixture to the hydrolysis bath containing from 0 to 4.1 parts of acetone, 0.3 part to about 5 parts by weight of a water-immiscible solvent and 1.7 to about 10 parts of water and then in the second and independent step mixing carbon dioxide, 0.45 to 2.5 parts and preferably from 0.45 to 0.6 part of acetone with organotrihalosilane and adding this mixture to the hydrolysis bath as mentioned previously where the parts of acetone, either in the premix or in the final hydrolysis mixture as well as the parts of water and water-immiscible organic solvent is based on the total amounts of diorganodihalosilane and organotrihalosilane to be utilized as reactants in the process of the present invention. The amount of carbon dioxide that is used in the second preferred method of carrying out the process of the present invention is an amount sufficient to substantially saturate the acetone organohalosilane solution whether it be the organotrihalosilane or the diorganodihalosilane. Preferably, from 5 to 10 parts of carbon dioxide by weight based on the weight of either the diorganodihalosilane or the organotrihalosilane are employed when the carbon dioxide is used as a solid.

Included by the organohalosilanes which can be employed in the practice of the present invention are silanes of the formula, (1)   $(R)_a SiX_{4-a}$ where R is selected from monovalent hydrocarbon radicals, halogenated monovalent hydrocarbon radicals, and cyanoalkyl radicals, X is a halogen radical such as chloro and $a$ is an integer having a value of 1 or 2. In addition, as pointed out previously, there can be employed in the hydrolysis mixture in combination with the organohalosilanes of Formula 1, above, an aliphatic monohydric alcohol of the formula, (2)   R'OH or there may be added as part of the organohalosilane reactants an alkoxylated organosilane of the formula, (3)   $(R)_a (R'O)_b SiX_{4-a-b}$ where R, X and $a$ are as defined above, R' is the same as R, $b$ is an integer equal to 1 to 3, inclusive, and the sum of $a$ and $b$ is equal to 2 to 4, inclusive.

As mentioned previously, in the preferred process of the present invention neither an aliphatic monohydric alcohol of Formula 2 is used nor is an alkoxylated organosilane utilized as part of the organohalosilane reactants of the present case.

Radicals included by R of Formula 1 above are mononuclear and binuclear aryl radicals and halogenated mononuclear and binuclear aryl radicals such as phenyl, xylyl, tolyl, chlorophenyl, naphthyl, and etc.; mononuclear aryl lower alkyl radicals wherein the alkyl group contains from 1 to 8 carbon atoms such as benzyl, phenylethyl, etc.; lower alkyl radicals and halo lower alkyl radicals wherein the lower alkyl group contains from 1 to 8 carbon atoms such as methyl, ethyl, propyl, butyl, chlorobutyl, pentyl, hexyl, heptyl, octyl, etc.; lower alkenyl radicals containing from 2 to 8 carbon atoms such as vinyl, allyl, 1-propenyl, etc. radicals; cycloalkyl radicals containing from 5 to 7 ring carbon atoms such as cyclobutyl, cycloheptyl, cyclohexyl, etc. radicals; cyano lower alkyl radicals wherein the lower cyanoalkyl group contains from 2 to 8 carbon atoms such as cyanoethyl, cyanopropyl, cyanobutyl, etc. radicals. Radicals included by R' of Formula 2 above are all of the aforementioned alkyl radicals having from 1 to 8 carbon atoms of R. In Formula 1 where R can be more than one radical, these radicals can all be the same or any two or more of the aforementioned radicals. Most preferably, R is, as is the case in the final resin product, selected from lower alkyl or mononuclear aryl radicals such as methyl and phenyl.

Included by the organohalosilanes of Formula 1 are, for example, methyltrichlorosilane, dimethyldichlorosilane, methylphenyldichlorosilane, phenyltrichlorosilane, diphenyldichlorosilane, cyanoethyltrichlorosilane, methylcyanopropyldichlorosilane, etc. Included by the partially alkoxylated organohalosilanes of Formula 3 are reaction products of organohalosilanes of Formula 1, where R is preferably monovalent hydrocarbon radicals and halogenated monovalent hydrocarbon radicals, with alcohols of Formula 2 such as methyl alcohol, ethyl alcohol, propyl alcohol, isopropyl alcohol, butyl alcohol, etc.

In instances where the aliphatic monohydric alcohol of Formula 2 is utilized in the practice of the present invention, the alcohol can be added directly to the organohalosilane of Formula 1 before hydrolysis, or it can be added to the hydrolysis mixture prior to the addition of the organosilane. As a result, the silanol-containing organopolysiloxane of the present invention can be free of or contain chemically combined alkoxy groups attached to the silicon. However, in no case can such chemically combined alkoxy groups attached to the silicon atoms of the silicone resin of the present case be more than 10 mole percent of the total substituent groups in the silicone resin product.

The silicone resins of the present invention can have from about 0.5 to about 12% by weight of hydroxy radicals attached to silicon and more preferably from 6% to 12% by weight of hydroxy groups attached to the silicon resin. The presence of this large amount of hydroxy group radicals in the silicone resin of the present invention allows the resin to cure completely at a very fast rate and thus gives the final cured resin a very high tensile strength or for that matter a flexure strength. Experience has shown that in most instances, the average ratio of the organo radicals to silicon in the silicone resin will determine the nature of the resin and its utility. If it is desired that the resin be as non-tacky as possible, then, of course, the organo to silicon atom ratio should be in the vicinity of 1.4. On the other hand, if it is desired that the resin of the present case have a maximum flexibility and still be acceptably non-tacky then, of course, the organo to silicon ratio is preferably as close to 1.7 as possible. As pointed out previously, although it may be possible to go outside the preferred ranges, nevertheless, in the most preferred embodiment of the present case, the ratio of the organo groups to silicon atoms is within the range of 1.4 to 1.7.

The resins of the present case are materials that have been found to soften at temperatures as low as 60° C. and generally flow at temperatures between 70 to 90° C. In fact, the resins of the present invention will flow at temperatures as high as 150° C. without curing to their final state. Thus, from these properties it can be seen that such characteristics readily permit the incorporation of standard resin curing catalysts into the resin at temperatures below 100° C., flow temperatures above 100° C. and up to as high as 150° C. without curing to their final form. Curing catalysts can be utilized in combination with the block copolymer silicone resins of the present invention at a weight proportion of from 0.1% to 2% by weight of the resin. For example, there can be employed ethylene diamine, dibutyltindi-2-ethylhexanoate, choline bicarbonate, zinc octoate, iron octoate, and etc. In addition to the curing catalysts, fillers can be employed in combination with the silicone resin to make various paints, laminates and coatings.

It should be pointed out that the unique properties of the present invention, that is, a combination of flexibility with non-tackiness prior to cure, allows the silicone resin of the present invention to be utilized for many purposes. Thus, the silicone resin of the present invention has a very good thermal shock resistance as well as heat aging due to its unusual flexibility properties. On the other hand, the fact that it is not tacky allows it to be used as a coating for various materials or as a laminate for various substrates such that the resin coating or laminate is not tacky prior to the final cure and can be stored or shipped without any damage resulting to the laminate product or the coated product. On the other hand, the unusual good flexibility properties of the block copolymer silicone resin of the present invention makes it very suitable for silicone paints and as ingredients in various types of paints and varnishes. The reason for this is not only does the resulting paint have high temperature resistance but it also has good thermal shock resistance and good heat aging properties. Fillers may be added to this resin so as to improve its tensile strength, flexure strength and other physical properties. A proportion of up to 200% by weight of the resin of filler can be employed. Fillers that can be employed are the common well known fillers such as titanium dioxide, lithopone, zinc oxide, zirconium silicate, silica aerogel, silica, either precipitated or fumed silica, iron oxide, diatomaceous earth, calcium carbonate, fumed silica, silazane treated silica, precipitated silica, glass fibers, magnesium oxide, chromic oxide, zirconium oxide, aluminum oxide, crushed quartz, calcium clay, asbestos, carbon, graphite, cork, cotton, synthetic fibers, and etc. As stated previously, such fillers may be present at a proportion of up to 200% by weight of the resin.

Suitable organic solvents that may be utilized in the process of the present case are, for example, any water-immiscible organic solvent which is inert to the hydrolysis reactants during hydrolysis, and in which the hydrolyzate is soluble to provide for its separation from the aqueous layer. For example, there can be employed hydrocarbon solvents such as benzene, toluene, xylene, etc.; esters such as, butyl acetate, ethyl acetate; ethers such as, diethylether and etc. During the addition of both the diorganodihalosilane and the organotrihalosilane, the hydrolysis mixture comprising the acetone, water-immiscible solvent and water is agitated to provide for a sufficient degree of hydrolysis of both the diorganodihalosilane and the organotrihalosilane and formation of the desired silicone resin hydrolyzate. The temperature of the hydrolysis mixture can be controlled by the rate of addition of external heat or cooling can be employed if desired. During hydrolysis, a temperature between 20° C. to 40° C. is preferred. However, temperatures above that may be used, the only limitation being is that it is not desired to use a temperature that is so high that it will result in the boiling off of the organohalosilanes or the acetone that is present in the hydrolysis mixture. In each case during the addition of the diorganodihalosilane and the organotrihalosilane the mixture is stirred for an additional period of time such as 30 minutes or more to allow for complete hydrolysis of the particular organohalosilane. The mixture is then allowed to settle and the acid layer is drawn off from the organic layer. The organic layer can then be stripped of solvent to a solids concentration of up to 95% or for that matter, up to 100%.

Depending upon the organo to silicon ratio in the block copolymer silicone resin it is sometimes preferably to strip either under reduced pressure or under atmospheric pressure. Thus, in some cases, it may be expedient to strip under the reduced pressure such as pressure between 25 mm. to 50 mm. mercury to a solids concentration of from 50% to 70% by weight of the resin solution. Resin impurities can be removed at this solids concentration such as by filtration, centrifuging, etc. Further stripping can then be employed to 100% solids at a temperature sufficient to remove all of the residual solvent. As for example, when stripping toluene a temperature of up to 130° C. has been found effective to result in 100% resin solids.

In the most preferred case of the present invention when the organo to silicon ratio is between 1.4 to 1.7, it is preferred to strip at atmospheric pressure to a solids concentration of 50 to 95%. Then, if it is desired the resin can be refluxed for 2 to 3 hours at a temperature between 190° to 230° to further improve the characteristics of the resin. Thus, at this solids concentration of 50 to 95% by weight or even at 100% solids by weight the resin solution may be added as a basic ingredient to paint. Thus, this resin product from the process of the present invention has been found useful in formulating high temperature paints, that is, paints that can withstand temperatures of up to 1200° C. The block copolymer silicone resin of the present invention does not degrade either by itself or in paints at temperatures up to 600° C. and degrades very slowly at higher temperatures. This improved degradation rate over prior art resins allows for more even fusion of metallic oxides used as pigments in the high temperature paints. The resulting paint imparts to objects on which they are applied and improved high temperature paint coating over that achieved with prior art silicone resin vehicles.

As pointed out previously, this resin may be utilized in paints as a coating to various materials with or without a catalyst, although a catalyst is obviously preferred since the silicone resin of the present case whether used in paints or in coatings will cure faster to the final state in the presence of a catalyst.

When the block copolymer silicone resin of the present invention is used to coat various tapes and objects as well as to form laminates, there is utilized a 50% to 95% solids solution of the resin in one of the common inert hydrocarbon solvents and particularly the water-immiscible or organic solvent in which it is prepared in accordance with the above-described process. There is added to this solution the necessary amount of catalyst. The tape or other substrate is then coated and allowed to air dry for anywhere from 1 minute to 20 minutes. At this state, after the air drying, the resin coating is non-tacky. However, it may be desired to partially cure the resin by condensing out some of the silanol groups in the block copolymer silicone resin of the present case. This may be done by taking the coated object and placing it in an oven at a temperature of anywhere from 50 to 100° C. for 2 to 30 minutes. It may be further desired to increase this partial curing of the silicone resin of the present case when it is coated on an object by further heating it in an oven maintained at a temperature of 100 to 150° C. wherein the coated object is maintained in said oven for anywhere from 1 to 20 minutes. The heating of the coated object or the laminated object at elevated temperatures allows some of the silanol groups in the silicone resin of the present case to condense out and thus partially cure the resin so that it is extremely non-tacky but still maintains its flexibility. This heating of the coated object at elevated temperatures is known in the art as B staging. Such a partial curing or B staging of the silicone resin on glass tape or on some other substrate so as to form a laminate results in precuring the silicone resin of the present case to the point that it may have only 0.5 to 1% by weight of unreacted hydroxyl groups remaining in the silicone resin. The tape may now be taken and wound about the object to be protected or insulated. The coated object or the laminate may then be taken and placed in an oven at a temperature above 190° and more preferably above 200° C. for a period of time of 10 minutes to 2 hours, and the silicone resin on the object or laminate will flow and bind with itself so as to form a coherent layer on the laminated object or so as to form a coherent coating on the object on which it was initially coated. Thus, a glass cloth tape may be coated with the silicone resin of the present case and the resulting glass tape may be allowed to air dry for 2 or more minutes. At the end of that time, it will be found that the coated glass tape is non-tacky as well as very flexible, that is, the tape may be bent in any manner without the silicone resin cracking or crazing. To make the coating on the glass tape even more coherent and non-tacky, the glass tape may be heated in an oven at a temperature up to 100° C., as pointed out previously, for 2 minutes or more, then may be taken and heated in an oven at 100° to 150° C. for 1 minute or more. At the end of the air drying and even more so at the end of the B staging of the coated glass tape, it will be found that the tape can be manipulated in any manner without cracking or crazing the block copolymer silicone resin of the present invention and in addition the silicone resin coating will be extremely non-tacky since the glass tape can be wound and maintained at ambient temperatures without the silicone resin flowing or massing in the wound glass tape. Thus, such a glass tape may be stored and shipped to various points. When it is ready to be used, the glass tape may then be taken and wound upon various electrical objects or electrical components for insulation purposes and then the covered component may be heated in an oven at temperatures of 200° C. or above for a period of 20 minutes or more and during such heating the silicone resin will flow and cure completely to form a coherent coating over the glass and the object about which the glass tape is wound.

So that those skilled in the art will be able to practice the invention, the following examples are given by way of illustration and not by way of limitation. All parts are by weight.

Example 1

There was charged to a reaction flask equipped with a condenser, agitator and thermometer 3000 parts of water and 900 parts of acetone. There was added to the mixture in the reaction flask a silane blend consisting of 216 parts of dimethyldichlorosilane, 282 parts of diphenyldichlorosilane and 540 parts of toluene. The rate of addition was controlled for 20 minutes controlling the peak reaction temperature below 45° C. The mixture was stirred for 30 minutes. Following the complete reaction of the first silane blend a second silane blend consisting of 208 parts of methyltrichlorosilane, 294 parts of phenyltrichlorosilane and 360 parts of toluene was added to the mixture in the reaction flask. The addition time was controlled for 20 minutes controlling the peak reaction temperature below 45° C. The mixture was stirred for 30 minutes and settled for 15 minutes. After settling the acid water layer was drawn off and discarded. The solvent was removed from the hydrolyzate under atmospheric conditions to 130° C. One percent diatomaceous earth (Celite 545) based on resin solids was added to the resin concentrate as a bodying nucleous. The solvent was further removed to 85-90% solids and a batch temperature of 165-170° C. for bodying of the resin. The bodying end point was reached in approximately eight hours. The viscosity was controlled by following the viscosity change with a Zahn Cup viscometer. Following the bodying end point the resin was cut with toluene and cooled. The diatomaceous earth was filtered from the resin. The resin solids was adjusted to 50% in toluene. A film of the resin was cast on a glass panel and allowed to air dry. The resin film was found to be non-tacky in 30 minutes and when the solvent was completely evaporated (dependent on film thickness) the resin was tightly air dried, exhibiting film toughness like that of heat cured polymers. The block copolymer silicone resin had an R to Si ratio of 1.5–1 and hydroxyl content of 1.7% by weight.

Example 2

There was charged to a reaction flask equipped with a condenser, agitator and thermometer 6000 parts of water and 1200 parts of acetone. There was added to the mixture in the reaction flask a silane blend consisting of 530 parts of dimethyldichlorosilane, 742 parts of diphenyldichlorosilane and 1145 parts of toluene. The rate of addition was controlled for 20 minutes controlling the peak reaction temperature below 45° C. The mixture was stirred for 30 minutes. Following the complete reaction of the first silane blend a second silane blend consisting of 212 parts of methyltrichlorosilane, 516 parts of phenyltrichlorosilane and 655 parts of toluene was added to the mixture in the reaction flask. The rate of addition was controlled for 20 minutes controlling the peak reaction temperature below 45° C. The mixture was stirred for 30 minutes and settled for 15 minutes. After settling the acid water layer was drawn off and discarded. The solvent was removed from the hydrolyzate under atmospheric conditions to 150° C. One percent sulphuric acid activated clay (Filtrol #1) based on resin solids was added to the resin concentrate as a bodying catalyst. The solvent was further removed to 85 to 90% solids at 170 to 180° C. for bodying of the resin. The bodying end point was reached in approximately 90 minutes. The viscosity was controlled by following the viscosity change with a lab pipette viscometer. Following the bodying end point the resin was cut with toluene and cooled. The Filtrol was removed by filtration. The resin solids was adjusted to 60% in toluene. A film of the resin was cast on a glass slide and air dried. The resin film was found to be non-tacky in 30 minutes and in 24 hours the film was tightly air dried.

The bodied resin at 50% solids from Example 1 and the bodied resin at 60% solids were catalyzed with 0.5% by weight of iron octoate and applied to heat cleaned glass cloth tape by dipping the tape in the resin solutions. The coated tapes were air dried for two minutes and then further dried and B staged under coating tower conditions for six minutes at 90° C. and twelve minutes at 150° C. The tack free coated glass cloth tapes were wound on a mandrel and placed in a preheated 200° C. oven for 30 minutes. The resins flowed and cured bonding the tape to the mandrel and underlying layers of tape.

It is readily seen that this method of application is advantageous for applying a silicone impregnated insulation material on electrical components over the prior art method of dipping or brushing on the resin.

It was found that the resin of the present case could also be applied to nylon, capton, Mylar, Nomex asbestos paper, mica paper, glass mica tape and other woven and non-woven flexible insulation type material following the above procedure for coating glass cloth tape.

I claim:
1. A process for the preparation of a non-tacky flexible silicone resin comprising hydrolyzing organohalosilanes consisting essentially of an organotrihalosilane and a diorganodihalosilane by first (A) agitating said diorganodichlorosilane in a heterogenous hydrolysis mixture comprising (1) from about 1.7 parts to about 10 parts by weight of water, per part of said organohalosilanes, (2) from about 0.2 to about 5 parts by weight of acetone, per part of said organohalosilanes, and (3) from about 0.3 part to about 5 parts by weight of a water-immiscible organic solvent, (B) adding with agitation in a separate and independent step from (A) said organotrihalosilanes to said hydrolysis mixture, and (C) separating an organic solvent solution from the hydrolysis mixture which solution contains a silicone resin having an average ratio from about 1.1 to 1.9 organic radicals per silicon atom, and having a silanol content of 0.5 to 12% by weight where the organo radicals of said organohalosilanes and of the silanol-containing silicone resin are attached to silicon by carbon silicon linkages and are selected from the group consisting of monovalent hydrocarbon radicals, halogenated monovalent hydrocarbon radicals and cyanoalkyl radicals.

2. The process in accordance with claim 1, which comprises in step (A), premixing the diorganodihalosilane and from 0.45 to 2.5 parts of the acetone immediately prior to hydrolysis in the remainder of said hydrolysis mixture and premixing the organotrihalosilane and from 0.45 to 2.5 parts of acetone immediately prior to hydrolysis in the remainder of the hydrolysis mixture.

3. The process in accordance with claim 1, which comprises mixing from 0.45 to 2.5 parts of the acetone, the diorganodihalosilanes and carbon dioxide in step (A) in an amount sufficient to saturate the acetone-diorganodihalosilane solution and adding the saturated solution to the remainder of the mixture comprising water, acetone and the water-immiscible solvent and then mixing from 0.45 to 2.5 parts of the acetone, the organotrihalosilane and carbon dioxide in step (B) in an amount sufficient to saturate the acetone-diorganodihalosilane solution and adding the saturated solution to the hydrolysis mixture.

4. The silanol-containing block copolymer silicone resin produced in accordance with the process of claim 1 where the organo radicals are selected from the class consisting of methyl and phenyl.

5. The process in accordance with claim 1 wherein the hydrolysis mixture contains from 2 to 6 parts of water, 0.3 to 2 parts of acetone and 0.1 to 2 parts of toluene.

6. The process of claim 1 wherein said organic solvent solution is stripped under reduced pressure to a solid concentration of between 50 to 70% by weight, filtered and then stripped to a 100% solids at a temperature up to 130° C.

7. The process of claim 1 wherein the organic solvent layer is stripped to a solids concentration of up to 95% by weight at atmospheric pressure, and then refluxed for two or three hours at up to 130° C. to 200° C.

8. A process for the preparation of a non-tacky flexible silicone resin comprising hydrolyzing organohalosilanes consisting essentially of an organotrihalosilane and a diorganodihalosilane by first (A) agitating said organotrihalosilane in a heterogenous hydrolysis mixture comprising (1) from about 1.7 parts to about 10 parts by weight of water, per part of said organohalosilanes, (2) from about 0.2 to about 5 parts by weight of acetone, per part of said organohalosilanes and (3) from about 0.3 part to about 5 parts by weight of a water-immiscible organic solvent, (B) adding with agitation in a separate and independent step from (A) said diorganodihalosilane to said hydrolysis mixture and (C) separating an organic solvent solution from the hydrolysis mixture which solution contains a silicone resin having an average ratio from about 1.4 to 1.7 organic radicals per silicon atom and having a silanol content of 0.5 to 12% by weight, where the organo radicals of organohalosilanes and of the silanol-containing silicon resin are attached to silicon by carbon silicon linkages and are selected from the group consisting of monovalent hydrocarbon radicals, halogenated monovalent hydrocarbon radicals and cyanoalkyl radicals.

References Cited
UNITED STATES PATENTS

| | | | |
|---|---|---|---|
| 3,489,782 | 1/1970 | Pruvost et al. | 260—448.2 |
| 3,624,030 | 11/1971 | Pruvost et al. | 260—46.5 |
| 3,661,845 | 5/1972 | Antonen | 260—46.5 R |
| 3,294,737 | 12/1966 | Krantz | 260—46.5 |
| 3,667,996 | 6/1972 | Antonen | 117—97 |
| 3,325,449 | 6/1967 | Ceyzeriat et al. | 260—46.5 |
| 3,666,830 | 5/1972 | Alekna | 260—825 |

DONALD E. CZAJA, Primary Examiner

M. I. MARQUIS, Assistant Examiner

U.S. Cl. X.R.

117—123 D; 161—193; 260—46.5 G, 825